2 Sheets—Sheet 1.
H. RANSFORD.
Apparatus for the Manufacture of Salt.
No. 209,984. Patented Nov. 19, 1878.
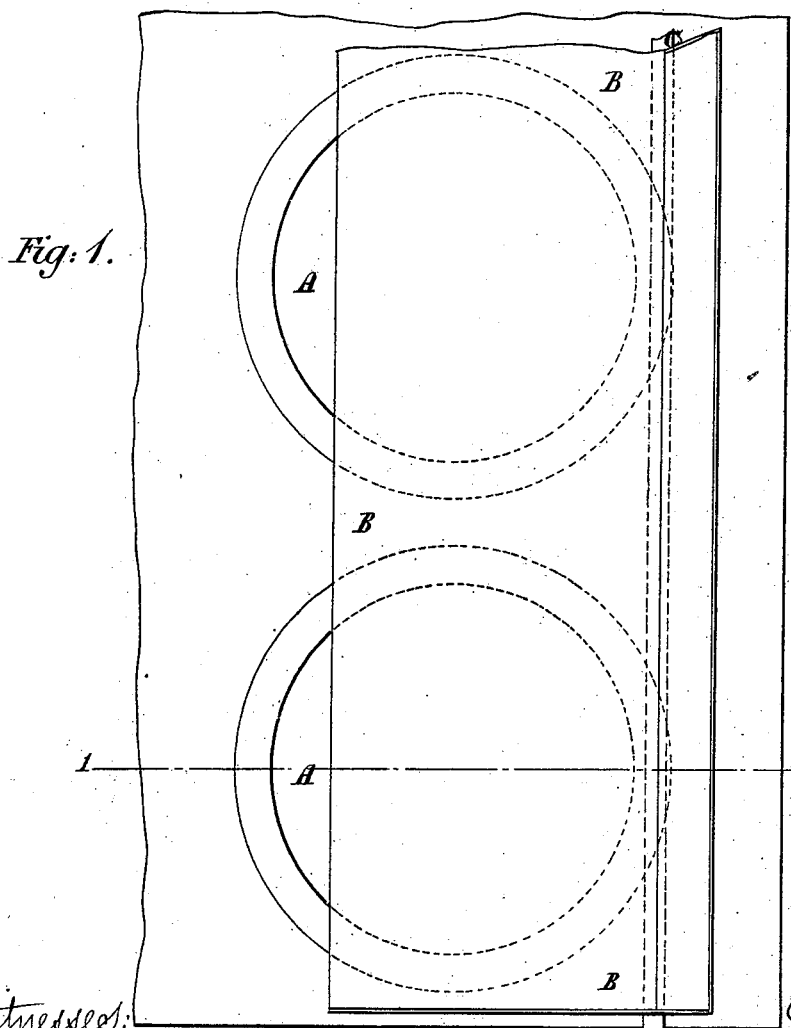

2 Sheets—Sheet 2.
H. RANSFORD.
Apparatus for the Manufacture of Salt.
No. 209,984. Patented Nov. 19, 1878.
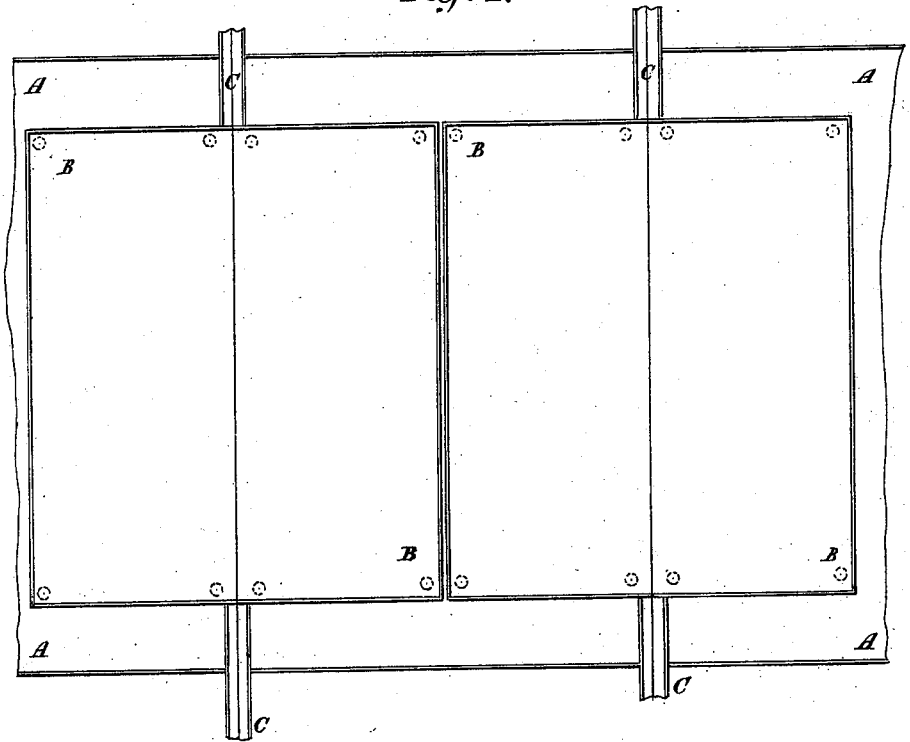

UNITED STATES PATENT OFFICE

HENRY RANSFORD, OF BRIGHTON, ENGLAND.

IMPROVEMENT IN APPARATUS FOR THE MANUFACTURE OF SALT.

Specification forming part of Letters Patent No. 209,984, dated November 19, 1878; application filed August 14, 1878; patented in England, May 29, 1878.

*To all whom it may concern:*

Be it known that I, HENRY RANSFORD, of 47 Buckingham Place, Brighton, in the county of Sussex, England, have invented new and useful Improvements in Apparatus for the Manufacture of Common Salt, which improvements are fully set forth in the following specification, reference being had to the accompanying drawings.

In the manufacture of common salt it is usual to evaporate brine in open pans or kettles, heated by fire beneath.

In one class of apparatus, over these pans or kettles have been placed heaters or vessels which receive the cold brine, in order that its temperature may be raised by the steam from the open pans or kettles. The under side of the heater is inclined, and the steam condensing upon it forms water, which runs down the inclined bottom, and is received into a gutter, by which it is conveyed away, so that it does not return into the pan or kettle.

My invention has for its object improvements in this class of apparatus; and consists in a peculiar construction of the apparatus, whereby ample space is left beneath and at the side (or sides) of the supplementary or upper heater (or heaters) to rake out the salt formed in the lower or main evaporating pan or kettle, or in a range or series of them.

The subject-matter claimed will hereinafter specifically be designated; and in order that my said invention may be most fully understood and readily carried into effect, I will proceed to describe the drawings hereunto annexed.

Figure 1 is a plan of a range of salt-kettles of an ordinary description, having a heater mounted over the kettles according to my invention. Fig. 2 is a transverse section taken on the line 1 1 in Fig. 1.

A A are the hemispherical kettles, heated in the usual way by fire beneath; but the furnace is not shown in the drawings.

B is the upper or supplementary heater, which is made of thin metal, and as smooth on the bottom as possible, so that the water resulting from the condensation of the steam may run down to the bottom of the incline, and not drip back into the kettles. The heater B only partially covers the kettles, overhanging them from their rear sides or backs to, say, two-thirds, or somewhat more, the distance across them, leaving an uncovered and unobstructed space at the front sides of the kettles to admit of the ready raking out of the salt as it falls, as well as facilitate the transferring of the contents of the heater to the kettles. The inclination of the bottom of the heater elevates it at front sufficiently above the kettles to leave ample room for raking out the salt.

C is the gutter, which receives the condensed water, and conveys it away to any convenient place where it may be discharged or utilized. The cold brine is delivered first into the heater B, and the supply for the kettles A is drawn from the heater. The salt is raked out from the kettles in the usual way. In some cases I arrange curtains, in order to partially confine the steam rising from the kettles.

My invention is, by obvious modification, also applicable where, in place of kettles, the salt-pan is employed, as is common in some places.

Fig. 3 is an elevation, and Fig. 4 is a portion of a plan, of such an arrangement.

A is the oblong shallow pan in common use. A portion of it only is shown in the plan view, and it may be of any convenient length. It is heated by fires beneath it at one end. B is the heater, placed over the pan A. It is made in parts or sections, and may cover the whole of the pan, with the exception of spaces at the sides of sufficient width to admit of the salt being raked out of the pan. C C are gutters, which receive and convey away the water resulting from the condensation of the steam, and which runs down the inclined bottom of the heater. The length of the pan A is such as to admit of several of the sections of the heater being received over it, and the whole, or nearly the whole, surface of the pan may be thus covered, with the exception of the spaces at the sides left for raking; but, on the other hand, if thought more convenient, the advantages of my invention may be in great part attained, and the apparatus may be simplified, by applying the heater only at the end of the pan which is over the fires. Thus the form of the apparatus may be to some extent varied without departing from my invention; but

What I claim is—

1. The hereinbefore-described apparatus for the manufacture of salt, consisting of the combination of the evaporating pan or kettle and the supplementary inclined bottomed heater, arranged above and only partially covering or overhanging said pan or kettle, whereby the salt may be raked out without obstruction, as set forth.

2. The combination, substantially as hereinbefore set forth, of the range or series of kettles, the heater above them inclined at its bottom and extending from the back or rear sides of the kettles part way only across them, and the gutter extending along at the backs of the kettles beneath the rear lower side of the heater, for the purpose specified.

HENRY RANSFORD.

Witnesses:
  G. F. WARREN,
17 *Gracechurch Street, London, Notary Public.*
  JNO. DEAN,
*Notary's Clerk,* 17 *Gracechurch Street, London.*